United States Patent [19]
Coleman et al.

[11] Patent Number: 5,844,620
[45] Date of Patent: Dec. 1, 1998

[54] METHOD AND APPARATUS FOR DISPLAYING AN INTERACTIVE TELEVISION PROGRAM GUIDE

[75] Inventors: Misti Coleman; Ann Marie Canfield; Mark K. Eyer; Zicheng Guo, all of San Diego, Calif.

[73] Assignee: General Instrument Corporation, Horsham, Pa.

[21] Appl. No.: 564,015

[22] Filed: Nov. 29, 1995

Related U.S. Application Data

[63] Continuation-in-part of Ser. No. 502,774, Aug. 11, 1995, Pat. No. 5,801,753.

[51] Int. Cl.⁶ .................................................. H04N 7/00
[52] U.S. Cl. ............................ 348/461; 348/906; 348/10
[58] Field of Search ................................ 348/10, 6, 7, 3, 348/12, 461, 385, 563, 731, 906, 13, 564, 569, 423; 386/83; 395/339, 340, 342, 352, 353; H04N 7/10, 7/12, 7/14, 7/00

[56] References Cited

U.S. PATENT DOCUMENTS

| | | | |
|---|---|---|---|
| 4,488,179 | 12/1984 | Kruger et al. | 348/706 |
| 4,706,121 | 11/1987 | Young | 348/27 |
| 4,977,455 | 12/1990 | Young | 348/460 |
| 5,223,924 | 6/1993 | Strubbe | 348/7 |
| 5,231,494 | 7/1993 | Wachob | 348/385 |
| 5,253,066 | 10/1993 | Vogel | 348/460 |
| 5,260,778 | 11/1993 | Kauffman et al. | 348/6 |
| 5,307,173 | 4/1994 | Yuen et al. | 348/731 |
| 5,353,121 | 10/1994 | Young et al. | 348/563 |
| 5,515,106 | 5/1996 | Chaney et al. | |
| 5,523,796 | 6/1996 | Marshall et al. | 348/906 |
| 5,583,562 | 12/1996 | Birch et al. | 348/423 |
| 5,585,838 | 12/1996 | Lawler et al. | 348/12 |
| 5,592,551 | 1/1997 | Lett et al. | 348/3 |
| 5,619,274 | 4/1997 | Roop et al. | 348/461 |
| 5,623,613 | 4/1997 | Rowe et al. | 395/353 |
| 5,629,733 | 5/1997 | Youman et al. | 348/7 |
| 5,630,119 | 5/1997 | Aristides et al. | 348/7 |
| 5,640,484 | 6/1997 | Mankovitz | 386/83 |
| B1 4,706,121 | 12/1993 | Young | 348/27 |

OTHER PUBLICATIONS

"Program Guide Interface Document for Grand Alliance," Version 1.01, Thomson Consumer Electronics, Indianapolis, Indiana, Nov. 29, 1994.

"Sailing Through TV Programming," *Appliance Manufacturer*, Jul., 1995, p. 6.

Brochure entitled "Sony Digital Satellite Systems," Sony Electronics, Inc., Park Ridge, New Jersey, May, 1995.

"Digital Satellite Receiver," Operating Instructions, SAT–B1, 3–800–183–21(1), Sony, ©1995.

"DRD203RW User's Manual," Satellite Receiver, RCA.

*Primary Examiner*—Tommy P. Chin
*Assistant Examiner*—Y. Lee
*Attorney, Agent, or Firm*—Barry R. Lipsitz

[57] ABSTRACT

An interactive on-screen visual interface guides a user through a menu of individual events available via an information network while allowing continuity of viewing of the current channel. The invention is especially applicable to the provision of an interactive program guide (IPG) for events such as television programs, movies, concerts, sporting events, interactive services, and the like which are available over a digital broadcast satellite (DBS) system or a cable television (CATV) network. A user can easily switch back and forth between a partial screen guide and a full-screen guide by a command entered, for example, on a hand-held remote control. The guide can be switched back to a non-display status. The guide's graphics can also be blended with video being viewed. The primary viewing channel can be resized to allow the user to view all of the primary channel while also accessing the guide. A trickle data stream provides programming information for a current time period, e.g., the next forty-eight hours, and is stored in a local memory for immediate access. A demand data stream provides programming information for a future time period, e.g., one week beyond the current period, and is acquired on a real time basis in response to a subscriber's request for future scheduling information.

22 Claims, 11 Drawing Sheets

METHOD AND APPARATUS FOR DISPLAYING AN INTERACTIVE TELEVISION PROGRAM GUIDE

BACKGROUND OF THE INVENTION

This application is a continuation-in-part of U.S. patent application Ser. No. 08/502,774 (M. Eyer et al.), filed on Aug. 11, 1995, now U.S. Pat. No. 5,801,753 which is incorporated herein by reference.

The present invention relates to a method and apparatus for allowing a user to obtain information and enter commands relating to the provision of services over a communication network. More particularly, the invention relates to an on-screen visual program guide that guides a user through a menu of individual events which are available via an information network.

The invention has particular applicability to the provision of an interactive program guide (IPG) for events such as television programs, movies, concerts, sporting events, interactive services, and the like which are available over a digital broadcast satellite (DBS) system or a cable television network (CATV). The program guide can be easily switched by a user between a partial screen guide and a full-screen guide so that the guide can be used while a current program is continuously viewed. In this way, attributes of other programming services available on other channels are determined while continuity of viewing is maintained.

The availability of digital networks for the transmission of games, information services, television programming (including movies and special events), shop at home services, and the like, has vastly increased the number and variety of such services available to consumers. Systems with 500 or more programming channels are contemplated and are expected to be in operation in the near future. One challenge that has emerged in the development and design of such systems is how to keep consumers informed as to the scheduling of the many different events that are offered. Additionally, there is a need for a convenient way to allow consumers to communicate via the television, for example, to order pay programming from a service provider, order goods or services from a shopping channel, and participate in contests, opinion polls, or other interactive activities.

In the past, where cable and satellite television systems have generally provided less than 100 channels, weekly or monthly program guides have been printed and distributed by mail. Periodical publications, such as *TV Guide*, have been available for purchase at newsstands or by subscription. However, any schedule changes made after the printing of the program guides render such printed guides inaccurate. Further, for the contemplated systems of 500 or more channels, the sheer volume of entries renders the use of printed program guides expensive and inconvenient. The indexing of the large number of programs is a complex task and a consumer's search for a desired program may be extremely laborious and inconvenient.

A logical solution to the problem of providing an accurate, up-to-date guide for a large number of events is to provide the guide via an electronic medium. Some CATV systems provide a dedicated channel which displays current programming. However, this is unsatisfactory in that only about one to three hours of programming is displayed and the information is usually scrolled slowly so that the user must wait to view a particular listing. Moreover, these systems lack any user interface capability and cannot be customized to suit the user's needs.

The communication industry is working toward the development of program guides that are downloaded to a subscriber terminal, such as a "set-top box" connected to a subscriber's television, in order to provide program schedule information. One stumbling block in implementing such an electronic program guide is the amount of bandwidth required to carry the large amount of scheduling information over a communication channel. Another obstacle is the amount of memory required to store scheduling data for a week or more within the set-top box. Such random access memory (RAM) is currently expensive. This conflicts with the requirement that a consumer set-top box be a relatively inexpensive item.

Another problem faced by developers of electronic guides to events available over a communication network is the provision of the schedule information in a timely manner. Subscribers would grow impatient if the response time for providing scheduling information in answer to a query for such information for a particular time slot takes too long. In an ideal system, a subscriber would receive an immediate answer to a request for scheduling information pertaining to a particular time period. After obtaining scheduling information, a subscriber may desire further details about a particular program. Again, it would be inconvenient to wait for more than a few seconds in order to obtain descriptive information about a program. Ideally, the description information should be provided almost instantaneously.

It would be advantageous to provide an interface for allowing a user to interact with a television program guide to events that is economical in terms of both communication bandwidth and cost. Such an interactive guide should respond to user inquiries and commands on an instantaneous or near instantaneous basis. The interactive service guide should be received by a relatively inexpensive set-top box, and adapt to the amount of RAM available in a particular set-top box. The interactive service guide should enable more advanced set-top boxes having more memory to respond to requests for schedule and description information even more rapidly than boxes having less memory.

It would be further advantageous to provide an interactive television program guide to events that is easily invoked and does not interfere with the viewing of a current program. The guide should be easily switched to a partial or full screen format or returned to a non-display status as desired by a user.

Additionally, the guide should be relatively easy to use. The guide should be easily navigated, for example, using a user interface device such as a hand held remote control. The guide should provide various options for display, including full or partial overlay of a program being viewed, blending of the program guide and the current programming, and reformatting of the existing program. Blending refers to the electronic mixing of video and graphics, where the graphics may be locally or remotely generated. Reformatting refers to the resizing of the video in either or both of the vertical and horizontal directions. Such reformatting would allow display of both the guide and the full existing program in a reduced size. In particular, it is desirable to provide reformatting of a program when the program guide is displayed in a partial screen mode, thereby allowing the viewer to continue to view a primary program in whole while also accessing the guide.

The guide should allow a user to directly tune to programs, obtain specific detailed program information (e.g., movie ratings and reviews), set program timers of a television and associated recording or playback device (e.g., a video cassette recorder—VCR), and add specific channels to a favorite channel list. The guide should allow presentation of information in a list or grid format and provide displays covering programming over varying time periods.

The present invention provides a method and apparatus for allowing a user to interface with an electronic television program guide which enjoys the above and other advantages.

SUMMARY OF THE INVENTION

In accordance with the present invention, a method and apparatus for displaying an interactive electronic television program guide are provided. The invention is an interactive guide to events which are received from an information network such as a CATV or DBS system. The guide works in conjunction with program data which is provided on the same network on which the programming is available. Additionally, a partial screen guide, or "mini-guide", can be displayed in an overlaid or blended fashion with the current program, thereby making the guide less obtrusive yet still visible. With the present system, an existing program can be reformatted when the program guide is displayed in a partial screen mode, thereby allowing the viewer to continue to view a primary program while also accessing the guide. The guide allows a user to determine the attributes of programming available on different programming services (i.e., channels) while maintaining continuity of viewing with a current primary channel.

The guide is easily invoked and minimizes interference with the viewing of a current program. The guide can be easily switched by a user to a partial or full screen format or returned to a non-display status. The guide can be easily navigated using a hand held remote control and provides various options for display, including full or partial overlay of existing programming, and blending of the program guide and the current programming.

The guide allows a user to directly tune to programs, obtain specific detailed program information, set program timers of a television and associated recording or playback device, and add specific channels to a favorite channel list. The guide provides presentation of information in a list or grid format and provides displays covering programming over varying time periods.

Moreover, the guide can be configured to provide a variety of informational displays and interactive capabilities. For example, the guide may contain the month, day and time slot of the program information being viewed. Typically, this will default to the current date and time when the guide is invoked. Channel call letters (e.g., MTV, CNN, ESPN, HBO, VH1, Cinemax) and channel numbers can be displayed. A particular channel can be highlighted upon entry into the guide, including the last channel viewed or a default channel. Start times of programs will be displayed, including odd start times (e.g., times that are not on the hour or half hour). Program titles and a description of the programming can be displayed. Provision is made to truncate text that does not fit within the display of a particular time span. Various icons (symbols) or colors can be used to indicate program attributes such as closed captioning (CC), colorization, black-and-white, stereo, surround sound, or Dolby® stereo, or to indicate whether the program is broadcast live, is one part of a multi-part series, contains dialogue in an alternate language, or is a repeat presentation.

Additionally, the guide may display ratings of program, including Motion Picture Association of America (MPAA) ratings (e.g., G, PG, R), a critic's rating (e.g., "3 stars" or "good"), or other rating indicating, for example, violence, nudity, or adult content. The guide may further display whether a program belongs to a specific class of programming such as movies, news, children's programming or comedy. Moreover, further subclasses may be defined (e.g., action movies).

The guide may display the start time, end time, and duration of a program. For pay programming, the guide may display the purchase price. The guide can require the user to provide authorization to view specific programs or channels, for example, by use of a password entered via the remote control. This feature is valuable for parents who want to prevent children from watching certain types of programming.

The guide may further allow the service provider to communicate with specific individuals or groups of users. See, for example, commonly assigned U.S. Pat. No. 5,260, 778 (Apparatus for Selective Distribution of Messages Over a Communications Network). In this manner, specific messages, advertisements and promotions may be directed at targeted groups. Groups may be defined by geographical area, distribution hub, or by common interests (e.g., boxing fans, comedy fans and so forth). Additionally, the guide allows individuals to order new programming services or change the level of service received.

A plurality of database "pages" is provided for communication over the information network. Each page corresponds to a particular time slot, and includes data defining the titles and descriptions of events offered during the time slot to which that page pertains. The database pages are transmitted via the information network at a transmission rate selected to enable the recovery of a particular database page within a predetermined acquisition time limit, to obtain schedule data for the time slot represented by that page.

The schedule data represents information services and messages identifying events provided by particular information services at particular times, and is transmitted in a preformatted form to facilitate the display of schedules by time slot at a decoder without performing the sorting at the decoder.

The database pages can be transmitted in a packetized transport stream wherein different categories of data are carried in different packet streams and each packet stream has a unique packet identifier (PID). For example, each of the database pages can be carried in a separate packet stream having an unique PID for that page. Foundation data necessary to decode the schedule data carried in the database pages can be provided in an additional data stream which has its own PID.

The database pages contain schedule data for time periods beyond a current period, for example, for a week or more beyond the current day. A separate stream of data is provided with schedule information for the current time period, e.g., the current day or a two day, forty-eight hour period. The separate stream has its own PID and provides the schedule information for the current time period at a rate which is slower than the rate at which the schedule data carried in the database pages are provided. In particular, the data for the current time period is provided in a low-rate "trickle data stream" and stored in the RAM of a subscriber set top box or the like. The data for future time periods is carried in a "demand data stream" which carries the data at a much higher rate and can be acquired on a real time basis in response to a subscriber's request for future scheduling information. Since the RAM available at the subscriber location will typically be less than that available to store all of the future schedule information, the provision of a separate high rate demand data stream allows timely acquisition of desired scheduling data. Moreover, the current scheduling data stored in RAM can be retrieved and displayed immediately.

In an example illustrated embodiment, a method and apparatus are provided for displaying an interactive electronic program guide to a plurality of programming services available via an information network from a service provider. A guide display area is provided on a primary display area of a device associated with said network in response to a user command, wherein the guide display area comprises a portion of the primary display area. The guide display area provides information on the attributes of the programming of at least one of the programming services (i.e., channels), and is switchable in response to a user command to provide information on the attributes of the programming of at least one other of the programming services. Furthermore, the primary viewing channel can be reformatted to reduce it in size (e.g., in either or both the horizontal and vertical directions) to allow the user to view all of the primary channel while also accessing the guide. This allows a user to access the guide with the possibility of viewing the programming displayed on the primary display area in whole. Additionally, the guide display and overlapped portion of the primary display can be blended. Thus, a user may easily select a partial overlay guide display with or without blending, a full guide display, or return to a non-display status by simply pressing a button on a hand-held remote control.

DETAILED DESCRIPTION OF THE INVENTION

In accordance with the present invention, a method and apparatus are provided for allowing a user to receive and interact with an interactive program guide (IPG) of services available via DBS or CATV systems, or the like.

Figure 1:
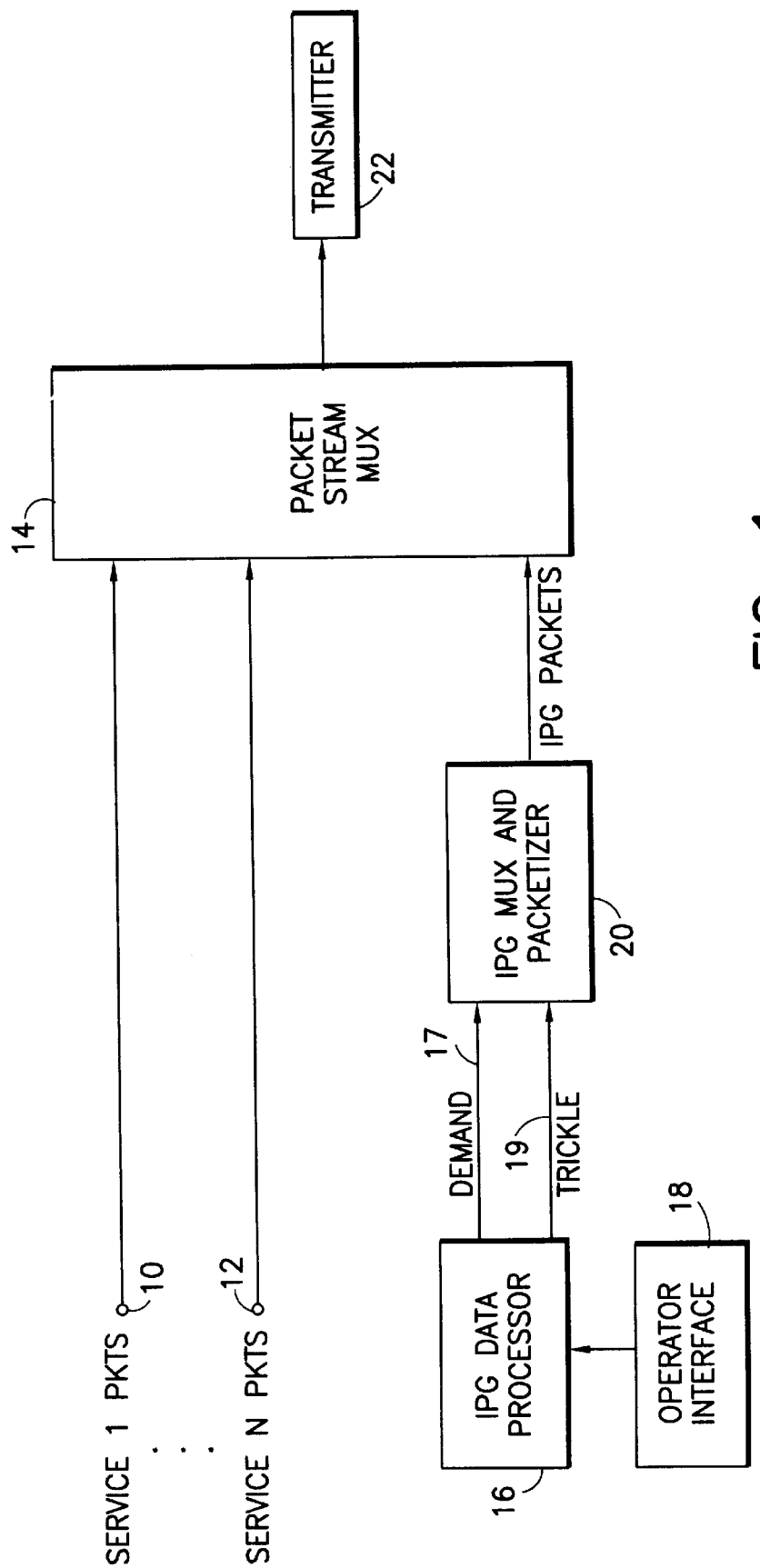
FIG. 1 is a block diagram of various elements necessary to generate an IPG packet stream.

FIG. 1 is a block diagram of encoder apparatus for assembling and transmitting interactive program guide (IPG) packets in a multiplex with various services to be provided over a communication network. A packet stream multiplexer 14 receives data packets for N different services that are input to the multiplexer via a plurality of terminals 10, 12. IPG packets are also input to the packet stream multiplexer 14 for multiplexing with the data packets for the different services. The services can provide, for example, events such as television programs (e.g., via a network service), movies (e.g., via the HBO service), special sports events, shop at home services, information services, interactive services, town meetings, and any other type of service available electronically via a communication network. The packet stream multiplex output from multiplexer 14 is transmitted over the communication network by a conventional transmitter 22. The communication network can comprise, for example, a satellite communication network, a cable television network or a telephone network.

IPG data is input to an IPG data processor 16 via an operator interface 18. The operator interface can comprise a workstation having a keyboard through which an operator inputs various scheduling information. Other input devices, such as optical character readers and voice recognition systems can also be used to input scheduling information to the IPG data processor. The scheduling information is typically organized by time slots within a particular day. The time slots can be any size, for example two, four, six, eight or 12 hours. For each event, a title can be provided together with the time at which the event is available. A description of the event can also be provided as part of the IPG data input via the operator interface.

The IPG data processor outputs both a high-speed demand data stream 17 and a low-rate trickle data stream 19. The trickle stream is used to improve the responsiveness and user friendliness of the program guide function by ensuring that the memory in a subscriber's decoder always holds a database which is up-to-date for current programming and can be used to facilitate the provision of a "mini-guide" display option, where a partial program guide is displayed over a small portion of a user's television screen while the rest of the screen continues showing television programs or other available services. Whenever a user desires to view a portion of the program guide database that is not stored in the decoder memory, the desired portion is acquired from the high speed demand stream. Thus, trickle data does not need to be present for programs scheduled farther in the future than can be held in the available decoders having the largest IPG RAM allocation. All other data is provided via the demand stream. It should be appreciated that such a mini-guide can also be provided without the provision of a trickle stream.

To simplify implementation, it is preferable for the trickle stream to be constructed using the same format as the demand stream(s). Data blocks received from the trickle stream are filtered in firmware at the decoder to reject those representing data farther in the future than the particular decoder's RAM can hold. It is also preferable to provide only one trickle stream per multiplex, with all of the current scheduling data being carried in that single stream. The demand data, on the other hand, may be provided in a plurality of different data streams carried in the multiplex output from packet stream multiplexer 14.

If the trickle and demand streams are both present on the same transport multiplex, they are multiplexed together and packetized in an IPG multiplexer and packetizer 20. The resultant IPG packets are input to the packet stream multiplexer 14 and combined with the packets for the various services carried in the transmitted multiplex, as indicated above.

By providing the most current schedule information (e.g., the schedules for the current one or two day period) in the decoder RAM, this information can be retrieved by a user without delay once the RAM has been loaded. The remaining data in the schedule database, i.e., the demand data, must be able to be acquired with as small a delay as reasonably possible within the constraints of system cost and complexity. Thus, if a user selects a time period of interest in the future, he must be able to see the program grid for the future time period (containing the schedule of events for that time period) in as short a time as possible. Preferably, this time will not exceed several seconds, and the program description information will be available no more than several seconds later (e.g., one to three seconds) for programs whose titles are visible on the screen. The necessary low acquisition time requires the delivery of IPG data not already stored in RAM at a high transmitted rate.

Even at high aggregate data rates (for example, in excess of one million bits per second—Mbps), the decoder must be able to keep up with the processing of messages received into its buffers. For example, aggregate rates as high as several Mbps may be offered.

The system meets the objectives set forth above by addressing pages by time slot, filtering data slots and pages using firmware and/or hardware filtering, providing multiple PIDs (packet identifiers) to simplify the filtering required, delivering the data in a preformatted manner, and using separate data blocks to communicate title information and program description information. Data associated with timed events is page addressed, with the page number identifying a time slot. Timed events include substantially all of the data in the database except for foundation data. The foundation data is necessary to control the processing of the IPG functions, and includes compression (e.g., Huffman) code tables necessary to decompress title and description text, channel name tables, and various well known data required to properly process the packetized data stream to recover the information carried thereby.

Time slots are numbered sequentially, e.g., starting at day zero of the global positioning satellite (GPS) time reference as well known in the art. Virtually any time slot size can be used. For the trickle stream, for example, slot sizes of two, three, four, six, eight, twelve or twenty-four hours are preferable to simplify processing. The slot size for the trickle IPG data may also be different than that used for the demand IPG data, as indicated in Table 1 set forth hereinafter.

The packets encapsulating demand IPG data can be packetized using either a few PIDs or many PIDs. Firmware filtering is best suited for implementations using many PIDs, each carrying a few pages. Hardware filtering can efficiently handle many pages being carried on a few PIDs. If enough PIDs are available so that only one IPG data page is assigned to one PID, then only PID filtering is necessary to acquire the page(s) and associated time slot(s) of interest. If several pages are carried on each PID, firmware filtering can be performed after PID filtering, based on a unique page identifier for each page carried under the PID. For instance, where four hour time slots are provided and one week of schedule data is offered, a total of forty-two PIDs may be supplied for the forty-two four hour time slots in a week (seven days=168 hours). In such an embodiment, since each page has its own PID, no page filtering is required at the IPG data processor.

The IPG data processor delivers the schedule data in a preformatted form. Although a decoder could be designed to accept and process individual database messages (i.e., records) such as daily schedules, title records, description records, etc., this approach would require substantial bandwidth overhead to deliver message headers and the like. Further, the requirement for such overhead would result in shorter message sizes, thereby creating additional processing overhead in the encoder and decoder. At the same time, the processing time to handle each message could limit the delivery rate, which would increase the acquisition time.

By delivering data to the decoders in preformatted blocks, efficient processing is provided, memory management waste is reduced, access time is reduced, and memory management is simplified. More particularly, by preformatting the schedule data at the transmitter side, operations such as sorting the data need only be performed once at the transmitter, and not at each of the millions of decoders that receive the IPG data. In addition to presorting the data, the IPG data is preformatted to provide relatively long messages (e.g., in one kilobyte segments) which are easier to process at the encoder where the streams are created as well as easier and faster to process and store in the decoder. By providing long messages, the decoder only needs to perform block copy operations necessary to construct a memory image, in order to keep up with the incoming flow of portions of the IPG database. Long messages also enable large blocks of memory to be allocated at the decoder, minimizing the overhead associated with the dynamic allocation of memory blocks. Processing time at the decoder is further reduced by allocating a large block of RAM for each of the large data blocks. No further central processing unit (CPU) overhead is required above that used to collect the memory image.

The delivery of preformatted IPG data to the decoders also enables entire blocks of IPG data to be purged from the decoder memory once the time slot associated with the data block has passed. Further, if the decoder RAM is running low, description data (as opposed to title data) can be purged, one slot at a time. The resulting RAM is left with large holes, rather than lots of small holes (i.e., fragmentation) that would slow the retrieval of the IPG data from the memory.

In the method and apparatus disclosed herein, the preformatted IPG data blocks are delivered to the decoders for direct storage in RAM. Moreover, the description records are logically separated from daily schedules and title records. This serves two purposes. First, the description records are large. In some instances, the decoder will not have enough RAM to hold descriptions for one or more time slots. Second, the description records can be distributed at a slower rate than the schedule and title records. This will enable the schedule and title records to be displayed very quickly, with a short wait, if necessary, for the description records.

An example of the format that can be used for the preformatted IPG data blocks is provided in Table 1, which sets forth the data block format in a C-language-like syntax that is a method of describing continuous and possible variable rate sequences of bits, instead of specifying a procedural program and its functions as in the computer language C. The first column of the syntax contains the syntax element. The second column gives the length of the syntax elements in bits. The third column of Table 1 gives the length of the syntax elements in bytes. The last column in Table 1 describes the information carried in various bits of the syntax element. The header "IPG_data_block(){. . . }" indicates that the syntax elements within the braces are a named set and may be invoked elsewhere in the syntax by simply using the designation "IPG_data_block()". A conditional occurrence of bit structures may be indicated with the usual "if" tests. The customary relational operators well known in the C-language are also available. Loop structures are possible and use the standard C loop header syntax. The syntax table is accompanied by a set of semantics, providing definitions for each previously undefined syntax field and placing constraints on their use. Five types of data blocks are defined, namely, schedule_listings, descriptions, common_listings, common_descriptions, and foundation data. The following IPG prelinked data block format can be used:

TABLE 1

| IPG_data_block(){ | Bits | Bytes | Bit Number/Description |
|---|---|---|---|
|   block_type_byte | 8 | 1 | |
|     reserved | 4 | | 7-4: reserved |
|     block_type | 4 | | 3-0:{foundation, common_listings, common_descriptions, schedule_listings, descriptions, rsvd1..N} |
|   version | 8 | 1 | range 1–255 |
|   if(block_type==foundation){ | | | |
|     slot_sizes_field | 24 | (3) | |
|       reserved | 12 | | 23-12: reserved |
|       common_block_time_slot_size | 4 | | 11-8:{_2,_3,_4,_6,_8,_12,_24,_48,_168, rsvd1..N} |
|       trickle_block_time_slot_size | 4 | | 7-4:{_2,_3,_4,_6,_8,_12,_24, rsvd1..N} |
|       demand_block_time_slot_size | 4 | | 3-0:{rsvd1, rsvd2,_4,_6,_8,_12,_24, rsvd3..N} |
|   }else{ | | | |
|     date | 16 | (2) | start of time period covered, days |
|     time | 8 | (1) | start of time slot, hours since mid. |
|   } | | | |
|   bundle_ID | 8 | 1 | range 0–255 |
|   reserved | 8 | 1 | |
|   data_block_length | 24 | 3 | units: bytes |
|   for(i==0; i<N; i++){ | | | |
|     is_a_group_byte | 8 | (1) | |
|     is_a_group | 1 | | 7: {no,yes} |
|     reserved | 7 | | 6-0: reserved |
|     offset_to_next_group_or_source | 24 | (3) | 0 indicates end of block |
|     if(is_a_group){ | | | |
|       reserved | 8 | ((1)) | |
|       group_ID | 8 | ((1)) | |
|     }else{ | | | |
|       source_ID | 16 | ((2)) | |
|     } | | | |
|     for(i==0; i<M; i++){ | | | |
|       offset_to_next_message_type | 24 | ((3)) | 0 indicates end of channel |
|       message_type_ID | 8 | ((1)) | |
|       for(i==0; i<P; i++){ | | | |
|         long_message | 1 | | {no, yes} |
|         if(long_message){ | | | |
|         message_length | 15 | ((2)) | (L) L=0 indicates end of group |
|         }else{ | | | |
|         message_length | 7 | ((1)) | (L) L=0 indicates end of group |
|         } | | | |
|         message_body() | 8*L | ((L)) | |
|       } | | | |
|       word_alignment | 0-8 | ((0-1)) | |
|     } | | | |
|     word_alignment | 0-8 | (0-1) | |
|   } | | | |
| } | | | | block_type: A 4-bit enumerated type field which identifies the type of IPG data block. The following C code defines the enumeration:

```
enum block_type { foundation, common_listings, common_descriptions, sched_listings,
descriptions, reserved1 ... N};
``` version: An 8-bit unsigned integer value in the range 1–255 which reflects the version or revision of the data contained in the block. Each time the database is updated (e.g., as a result of program changes, deletions or additions) a new version of the data block covering the affected time slot is generated.

foundation: The block contains untimed data (foundation data) rather than time-related data. The foundation type allows the same data block format to be used for untimed data, such as the compression tables, program theme classes, and channel names.

common_listings: The block contains a single copy of each repeated program listing whose first occurrence is in the common_block_time_slot covered by the common_listings block. A repeated program listing is defined as a listing that is shown more than once, within the trickle database lookahead, either on an affiliated group of channels or on a single channel which does not belong to any group. No such listing shall be included in any schedule_listing block (see below). This block type applies to trickle data only.

common_descriptions: The block contains a single copy of each repeated program description whose first occurrence is in the common_block_time_slot covered by the common_descriptions block. A repeated program description is defined as a description that is shown more than once, within the trickle database lookahead, either on an affiliated group of channels or on a single channel which does not belong to any group. No such description shall be included in any description block (see below). This block type applies to trickle data only.

schedule_listings: The block contains daily schedules and program listings specific to each time slot. For trickle data, these listings correspond to single-show programs—those which are shown only once within the lookahead.

descriptions: The block contains program descriptions specific to each time slot. For trickle data, these descriptions correspond to single-show programs—those which are shown only once within the lookahead.

common_block_time_slot_size: A 4-bit enumerated type field which defines the time slot size in hours for common_listings and common_descriptions blocks. The slot size for these common data blocks shall be selected so that it is an integer multiple of, or equal to, the slot size used by the trickle data blocks. The following C statement defines the enumeration:

```
enum common_block_time_slot_size {two_hours, three_hours, four_hours, six_hours,
eight_hours, twelve_hours, twenty_four_hours, forty_eight_hours,
one_hundred_sixty_eight_hours, reserved1 ... N};
``` trickle_block_time_slot_size: A 4-bit enumerated type field which defines the time slot size in hours for the trickle schedule_listing and description blocks. The following C statement defines the enumeration:

```
enum trickle_IPG_time_slot_size {two_hours, three_hours, four_hours, six_hours,
eight_hours, twelve_hours, twenty_four_hours, reserved1 ... N};
``` demand_block_time_slot_size: A 4-bit enumerated type field which defines the time slot size in hours for the demand schedule_listing and description blocks. The following C statement defines the enumeration:

```
enum trickle_IPG_time_slot_size {reserved1, reserved2, four_hours, six_hours, eight_hours,
twelve_hours, twenty_four_hours, reserved3 ... N};
``` time: An unsigned integer in the range 0 to 23 which represents the hour in the day which is the starting point for data defined in this block. The time field is ignored for foundation data blocks.

date: An unsigned integer in the range 0 to 0xFFFF, representing the day for which schedule data is carried in the block. Day zero is Jan. 6th, 1980 (GPS day zero). The date field is ignored for foundation data blocks.

bundle_ID: Channels are logically divided into "bundles" to efficiently accommodate different channel configurations at the set-top units. The bundle_ID is an 8-bit unsigned integer in the range 0 to 255 identifying each bundle of source channels and groups. The value 0 defines the "common bundle" which includes channels common to all configurations; while other values of bundle_ID identify configuration specific bundles. Typically, a set-top converter requires bundle 0 and one or more other bundles for its configuration.

data_block_length: A 24-bit count of the number of bytes to follow in the block.

offset_to_next_group_or_source: A 24-bit number representing the distance in bytes to the next group of source channels or the next source channel, i.e., the length of all data to follow for the specified group_ID or source_ID. This field is ignored for the foundation blocks.

group_ID: The identity of the affiliated channel group to which the messages to follow apply. When is_a_group is set, the listing and description record IDs are shared among all the source channels in the group. This field is ignored for the foundation block.

source_ID: The identity of the channel to which messages to follow apply. The source_ID uniquely defines the channel's identity. This field is ignored for the foundation blocks.

offset_to_next_message_type: A 24-bit number representing the distance in bytes to the next type of messages.

message_type: The IPG message type common to all messages to follow.

long_message: A Boolean flag which indicates, when set, that the message length is a 15-bit field. When clear, the message length field is 7 bits.

message_length: A 7 or 15-bit field defining the length of the message body to follow.

message_body(): The body of one given IPG message. The header portions are not stored, but their contents are reflected in fields such as the group_message_type and message length.

word_alignment: These fields supply from zero to one byte of padding, used to bring the particular part of the block to a word boundary, for processing and addressing efficiency.

The following are examples of IPG message types that can be provided:

attribute name, class name, named class assignment, sortable class assignment, sortable subclass assignment, translation table, decode table, clear data, database lookahead, source name, schedule record, program title, program description, program package, pay-per-view program, etc.

Figure 3:
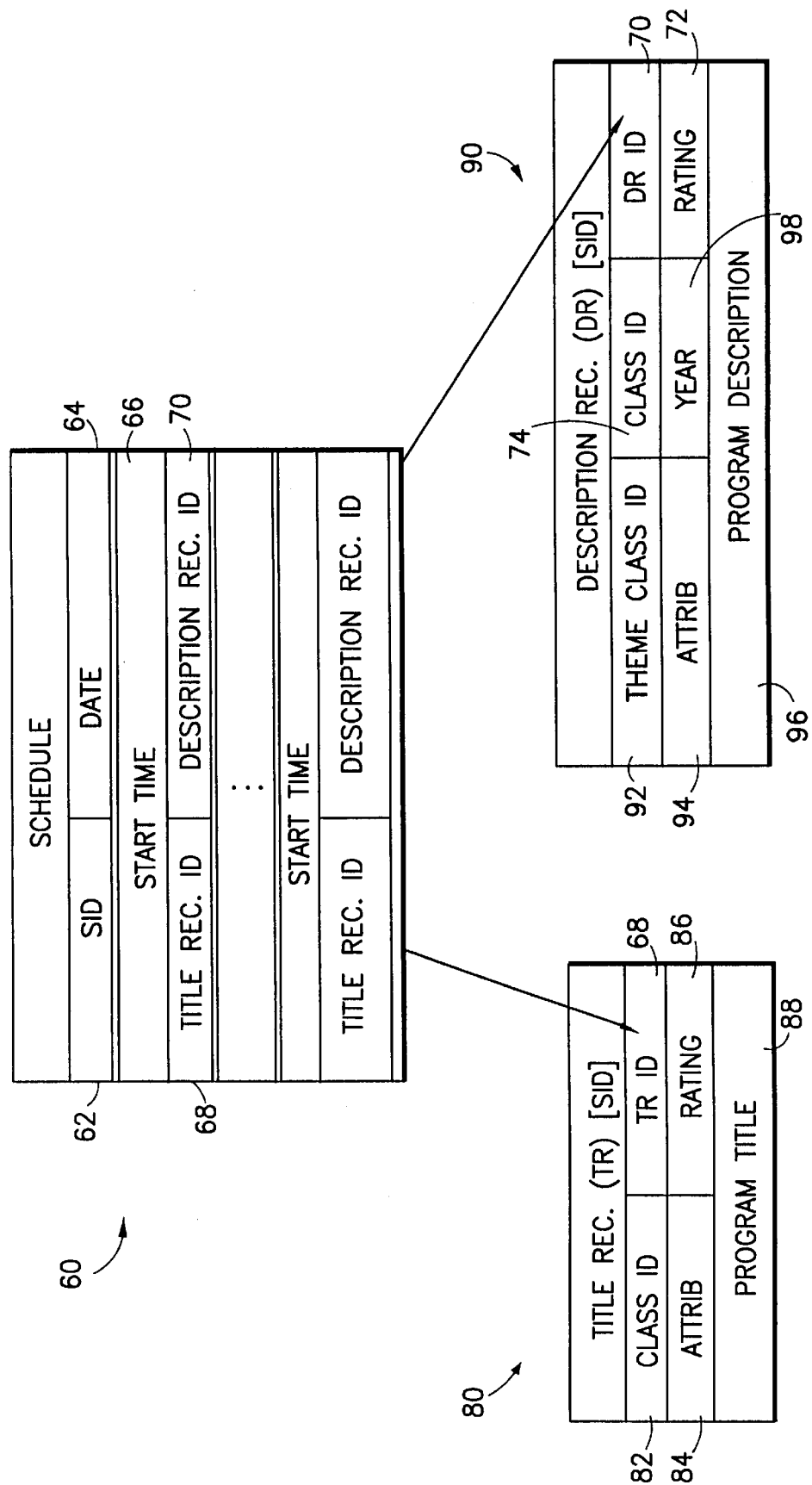
FIG. 3 is a diagrammatic illustration showing a preferred method of communicating schedule information including title records and description records.

An example of the structure of one particular IPG message type, namely the schedule record, is provided hereinafter in the discussion of FIG. 3. As is evident from Table 1, messages are sorted first by channel number (source_ID) and then by message type. The innermost loop lists a number of messages in a "group" of messages having a common message type.

The prelinked demand IPG data blocks are delivered as high speed messages in multiple PIDs. Prior to transmission, the data blocks can be formatted into text messages and encapsulated within transport frames (e.g., high level data link control-"HDLC"-frames) for output from a serial output port for eventual transmission.

The IPG_data_block() itself is transported to the decoder in a manner that is compatible with the delivery of digital services on a digital multiplex. In the MPEG-2 compatible system described here, the IPG_data_block () is placed inside a message header which includes message type (MPEG Table_ID) and length. The whole message is packetized according to the packetization rules defined for MPEG-2 multiplexes and delivered in a PID stream referenced by an MPEG "Program Map Table" (PMT).

Another function of the message header is to provide segmentation control. Typically, one particular instance of an IPG_data_block() is larger than 1024 bytes and thus may have to be segmented for delivery.

Figure 2:
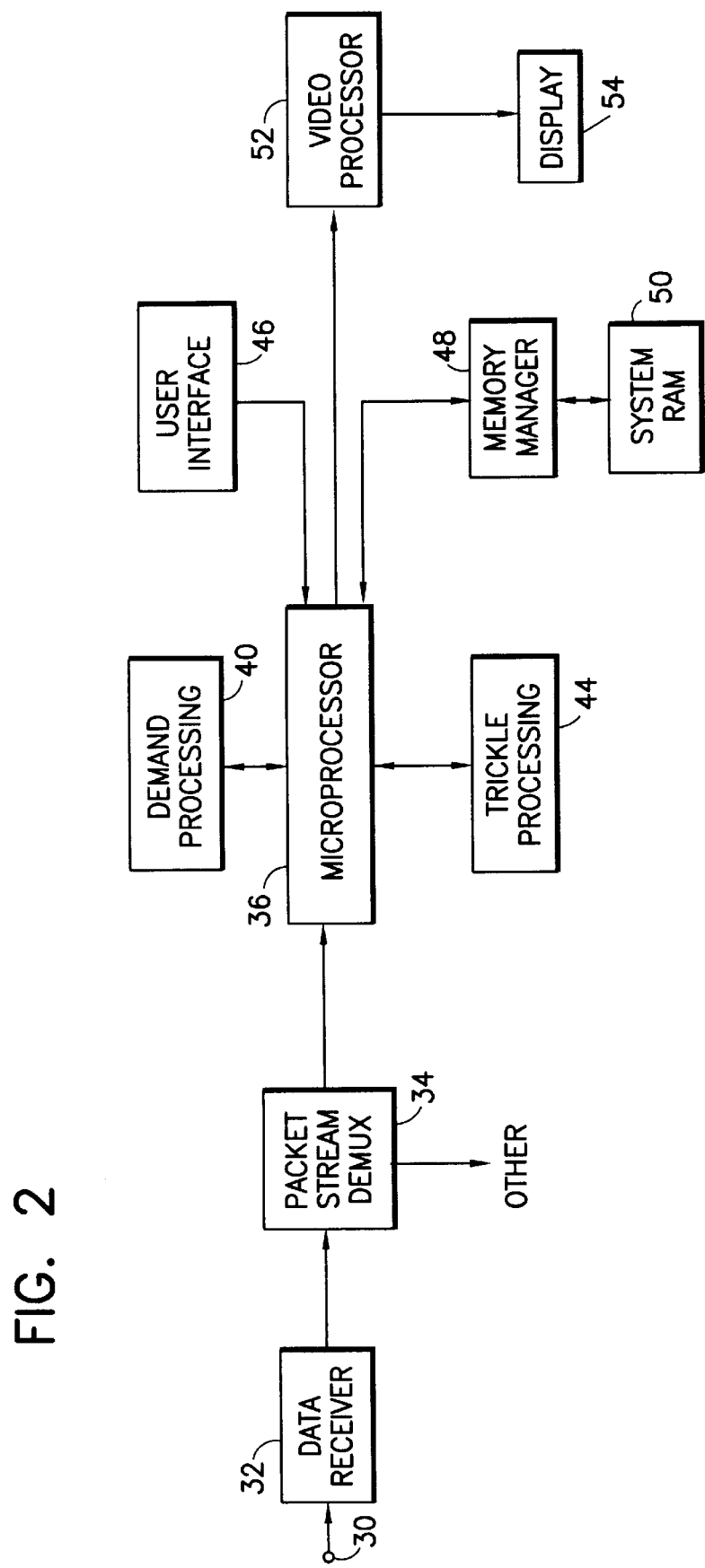
FIG. 2 is a block diagram of apparatus for receiving and decoding IPG data.

The transmitted messages are received by a population of receivers via the communication channel which can comprise, for example, a satellite link or cable television distribution path. A block diagram of the pertinent portions of an example receiver implementation is provided in FIG. 2. A data receiver 32 receives the transmitted data stream via an input terminal 30. The received data is provided to a packet stream demultiplexer 34 that outputs the demand and trickle IPG data packets to an IPG microprocessor 36. Other packets in the transport stream, which may include video and audio packets, are also output from the packet stream demultiplexer 34.

Microprocessor 36 separately processes the demand and trickle data streams. Demand processing is provided as indicated at 40, at a rate established by the incoming data products. Trickle processing is provided as indicated at 44, at a rate determined by the incoming trickle data. Typically, the demand processing occurs at a much higher rate than the trickle processing. For example, the data rate for the demand stream will be on the order of 1–2 Mbps, while the data rate of the trickle stream will be on the order of ten kilobits per second (Kbps). Since the trickle data is stored locally in the receiver's memory, there is no need for it to be provided in a high rate data stream as it will be instantly accessible from the decoder RAM, also referred to herein as the receiver system RAM.

Loading of the trickle data as well as selective portions of the demand data into the receiver system RAM 50 is controlled by a memory manager 48 coupled to microprocessor 36. The memory manager will address the RAM 50 in a conventional manner to store the trickle and demand data for subsequent retrieval by the microprocessor and display on a monitor 54 or the like coupled to a video processor 52. Selection of particular time slots of future scheduling information carried in the demand data stream is made via a user interface device 46. The user interface device can comprise, for example, a remote control coupled to input instructions to microprocessor 36 in a well known manner.

One function of memory manager 48 is to monitor the amount of free memory available in the receiver system RAM 50. In the event that the amount of memory available is less than that required to store the title and description records for a time slot of interest, the memory manager can purge description records from the receiver system RAM in order to make room for all of the title records. In this manner, the title information will be immediately available to a user once it has been stored in the receiver system RAM. If there is not enough room to store the corresponding description information, the description record for an event requested by a user can be obtained from the demand data stream on an as needed basis. Since the demand data is transmitted at a high rate, the acquisition time for a requested description not already stored in receiver system RAM 50 will be fairly short.

In the preferred embodiment, the amount of receiver system RAM 50 allocated for IPG data will be enough to hold at least twenty-four, and preferably forty-eight hours of current schedule information. Where the RAM can hold forty-eight hours of information, a schedule for two full days of events at a time can be provided virtually instantaneously using information from the trickle data stream which is stored in receiver system RAM 50.

In an embodiment wherein the data carried by the demand and trickle streams is provided in separate pages, and each of the pages is carried in a separate packet stream identified by a unique PID in the transport multiplex, microprocessor 36 can provide first and second PID processors for acquiring schedule information spanning two consecutive time slots. The separate PID processors could be implemented in either hardware or firmware. The first PID processor will acquire schedule information contained in a first page for a first time slot. The second PID processor will acquire schedule information contained in a second page for a second time slot that immediately follows the first time slot. The microprocessor will selectively combine portions of schedule information acquired by the first and second PID processors to provide a schedule of events available during a time period spanning the first and second time slots. The combined schedule is output to video processor 52 for display on display 54.

In order to simplify the processing provided by microprocessor 36, a service carried on the information network can be divided among a plurality of different data streams, each having its own PID. Processing is simplified in such an embodiment because the individual data rates are smaller. At higher data rates, hardware filtering may also be required.

There are two different types of elementary PIDs which make up the demand IPG download service. One type carries only records describing time slots. The other type carries foundation data. The records describing time slots include daily schedule/title records and description records. For instance, the records describing time slots can be carried in the form of a "schedule record" that combines title and description information into a daily schedule. Examples of such IPG data record structures are illustrated in FIG. 3. It should be appreciated that many other message types are transmitted in a similar manner.

A schedule record generally designated 60 is identified by source_ID (SID) 62 and date 64. This information is not stored in the message body portion of the IPG data block carrying the record, since it can be found within the header portions of the block at various levels. Schedule records are transmitted in the form of N blocks (one block per time slot), each block defining all title and description records via title record Ids 68 and description record IDs 70, indexed by the start time 66 for the particular program or event. Each of the title/description references for an entire day or any portion of a day. Thus, the schedule record structure can handle any desired slot size.

TABLE 2

| daily_schedule_message(){ | Bits | Bytes | Bit Number/Description |
|---|---|---|---|
|   group_schedule_byte | 8 | 1 | |
|     reserved | 7 | | 7-1: reserved |
|     group_schedule | 1 | | 0: {no, yes} |
|   if (group_schedule)) { | | | |
|     reserved | 8 | (1) | |
|     group_ID | 8 | (1) | |
|   }else{ | | | |
|     source_ID | 16 | (2) | |
|   } | | | |
|   schedule_date | 16 | 2 | days |
|   number_of_entries_field | 8 | 1 | |
|     reserved | 2 | | 7-6: reserved |
|     number_of_entries | 6 | | 5-0: range 0–63 |
|   for(i==0; i<number_of_entries; i++){ | | | |
|     program_listing_reference | 24 | (3) | |
|       listing_ID | 12 | | 23-12: |
|       description_present | 1 | | 11: {no, yes} |
|       start_time | 11 | | 10:0: min. since midnight |
|     if (description_present is set){ | | | |
|       description_ID_reference | 16 | ((2)) | |
|       reserved | 4 | | 15-12: |
|       description_ID | 11 | | 11-0: |
|     } | | | |
|   } | | | |
| } | | | |

N blocks contains the title and description information for all events within a particular time slot.

Each title record 80 contains compressed text defining the title of the program or event. The title record also includes a class ID 82, title attributes 84 and a rating 86. Class IDs 82 provide a set of sortable theme classes and theme subclasses for use in selecting schedule categories by a particular theme, such as sports, movies, comedy, etc. They can also be used, e.g., to identify the record as a title record, or to identify a service as a pay-per-view or non-pay-per-view event. Title attributes are used to represent various text messages in a compressed form. For example, a plurality (e.g., 12) of attribute bits may be provided, each representing a different message relating to the events provided. For television programs, example messages that can be indicated by different attributes are "stereo," "premier," "rerun," "series," "special event," etc. Ratings 86 are taken from the standard ratings for movies and are used as guidelines as to the nature of the movie's content. The actual program title 88 is also provided in the title records 80.

Description record 90 comprises a theme class ID 92, description attributes 94, the actual program description 96 (which may be compressed) as well as the year 98 in which the program was first released. Rating information 72 and a class ID 74 is also provided in the description record. The description attributes can be the same as or different from the attributes in the title records. The theme class ID is like the class ID of the title record, and identifies the type of event, such as sports, movies, comedy, talk show, children's program, etc. The class ID identifies the record as a description record. The structure of the title and description records makes it possible to convey information in a service database to the system users in an extremely versatile manner.

Table 2 sets forth the structure of the schedule record in detail. The shaded areas of Table 2 are not stored in the message body portion of the IPG data block, since they can be found within the header portions of the block at various levels. Further, the daily_schedule message can include title/description references for an entire day or any portion of a day. Thus, the schedule record structure can handle any desired slot size.

When group_schedule is set, the schedule is assigned to a group of sources, instead of a single source. When group_schedule is false, and the source belongs to an affiliated group, the daily schedule is an exception schedule; i.e., the daily schedule defines the differences between the source's schedule and the base-line group schedule. When group_schedule is false, and the source does not belong to an affiliated group, then the schedule uniquely defines the day's programming for the independent source.

group_ID specifies the identity of the group to which the daily schedule is assigned.

source_ID specifies the identity of the source to which the daily schedule is assigned.

schedule date specifies the calendar day (day 0=Jan. 6, 1980) of the daily schedule.

number of entries specifies the number of programs referenced by the daily schedule.

listing_ID identifies the program listing shown at the given start_time.

description_present indicates whether a program description record is referenced for the given start_time.

description_ID identifies the program description shown at the given start_time.

If desired, the data blocks in the IPG stream can be arranged such that description records are repeated at a lower rate than schedule/title data. One arrangement is to skip the description records in every other pass through the data. In another arrangement, the data is interleaved and organized with all of the schedule/title blocks being provided interleaved with a first half of the descriptions, and then all of the schedule/title blocks being transmitted interleaved with the second half of the description data. This format would repeat so that only half of the descriptions are sent at any one time with all of the schedule/title blocks.

Figure 4:
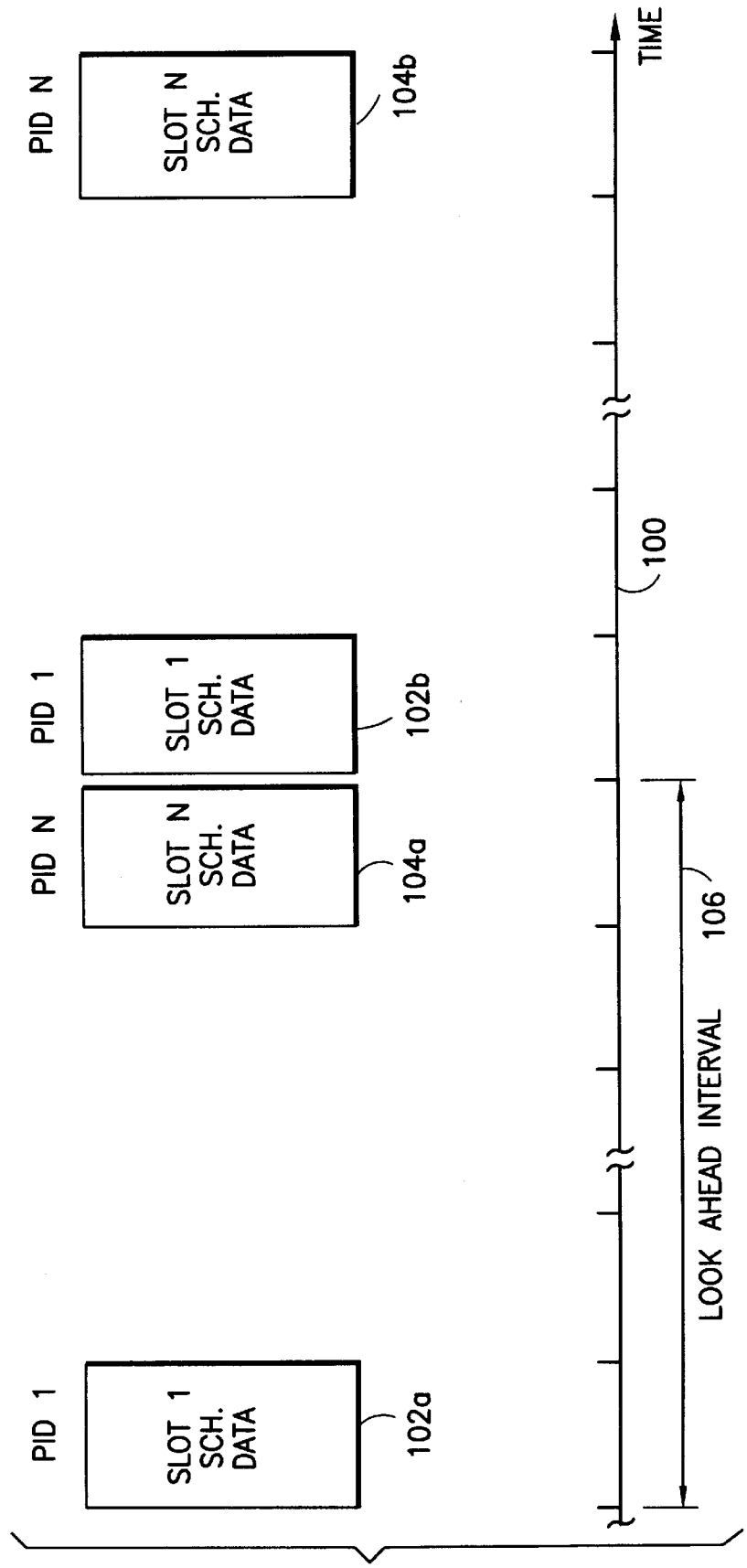
FIG. 4 is a diagrammatic illustration illustrating the labeling of schedule data for different time slots with unique PIDs for each look ahead interval.

FIG. 4 illustrates the arrangement of the IPG data over a look ahead interval. For example, the trickle data stream may contain scheduling information for a current forty-eight hour period (e.g., two consecutive days) and the demand data stream may contain information for the current day plus an additional six days to provide schedule information for a one week period. In this example, the look ahead interval 106 is seven days. The seven day interval is broken down by time slots (e.g., four hours at a time) as indicated on time line 100. The schedule data is organized by slot. Thus, all of the schedule data for a first time slot is provided in a first page 102a which is identified by a unique PID (PID 1). Each successive page of data for each successive time slot will be identified by its own PID. The last slot in the look ahead interval is occupied by page 104a, having PID N.

The same format is used for the next seven day look ahead interval. The first slot of the next look ahead interval is occupied by page 102b, the packets of which are identified in the packet stream by PID 1. The last slot in the second look ahead interval illustrated in FIG. 4 is occupied by page 104b. The data packets carrying the scheduling information for page 104b are identified by PID N. This format continues indefinitely for successive look ahead intervals.

It should be appreciated that although FIG. 4 illustrates an example wherein the number of different PIDs (N) equals the number of slots in the look ahead interval, this one-to-one relationship is not necessary. In fact, the number PIDs does not have to bear any relationship to the number of time slots in the look ahead interval. Where the number of time slots in the look ahead interval exceeds the number of PIDs, the PIDs will be repeated within the look ahead interval in cycles such as PID 1, PID 2, . . . PID N, PID 1, PID 2, . . . PID N, PID 1, PID 2, . . . Although individual PIDs can be repeated within a look ahead interval, the schedule information will not be repeated. Thus, each instance of the same PID within the look ahead interval will correspond to different schedule information, so that each slot will contain only the particular schedule information associated with the time period covered by that slot.

Figure 5:
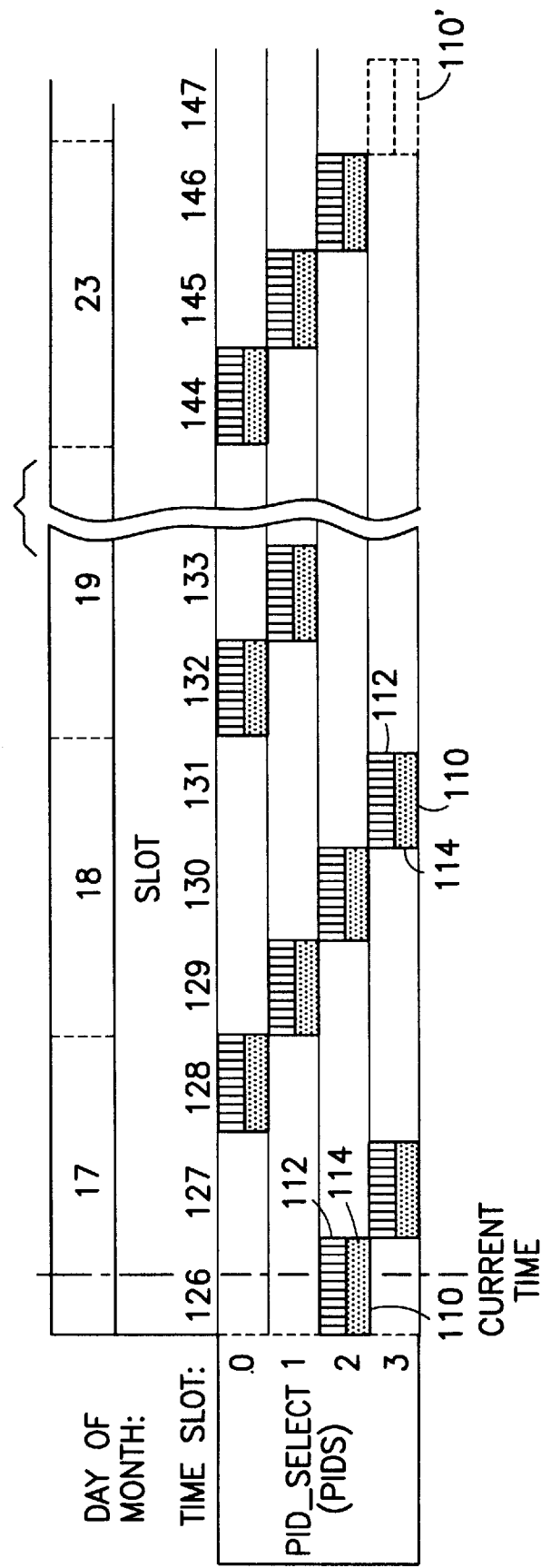
FIG. 5 is a diagrammatic illustration providing an example of how IPG data slots are assigned to PIDs to enable scheduling data to be provided for the guide between two consecutive time slots.

FIG. 5 illustrates a scheme for assigning IPG data slots to PID_select (PIDS). PID_select is used to select the PID in which a particular data block is to be transmitted to the decoder.

Slots containing timed IPG data blocks are numbered sequentially, e.g., starting at GPS day zero. In general, if N PIDs are to be used, the slots will be partitioned into groups of size N. The first slot in each N-slot group is assigned to PIDS 0 (i.e, PID_select=0). The second slot will be assigned to PIDS 1, and so on. FIG. 5 illustrates such an assignment with an example for four PIDs, an eight hour slot size and a 21 slot (i.e., one week) database look ahead. Each slot 110 contains both schedule/title data blocks 112 and description data blocks 114.

The IPG data slot to PIDS assignment illustrated in FIG. 5 always guarantees that two consecutive slots are assigned to two distinct PIDS. This is due to the staggered assignment of slots to the PIDS. As a result, the data acquisition/processing task can be divided evenly between two PID processors (e.g., implemented in firmware in microprocessor 36—FIG. 2) in the event that two slots are required to compose a scheduling grid for display to a user. Further, in preparing for time transitions (e.g., at slot boundaries if the slot size is four hours, or at four hours into each slot if the slot size exceeds four hours), only two out of the N PIDS (assuming N>1) need to be updated by removing a past slot and adding a future slot.

Referring to FIG. 5, since the slot size (eight hours) is larger than two, the update is performed at two hours into slot 127 (i.e., at 10:00 AM on the seventeenth day of the month, with the current time falling in slot 126). This requires removing slot 126 from PIDS 2 and adding slot 147 to PIDS 3, as indicated at 110'. The other PIDS (PIDS 0 and 1 in slots 128, 129) remain intact, although versions may change for the data blocks in each PID. This approach allows smooth transitions to a new service definition at the transition times without disrupting the processing in the decoder.

A method and apparatus for communicating and processing an interactive guide to events via an information network that carries various information services has been described. An event listed in the interactive guide is available by subscribing to the information service that offers the event or by purchasing the event on an individual basis. The data for the interactive guide can be communicated in both a trickle data stream for current schedule information and a demand data stream for future schedule information. The current data from the trickle data stream is stored at the receiver for virtually instantaneous retrieval. The demand data is cyclically and continuously provided in a high speed data stream for selective acquisition of schedule information for a time period of interest. Title and description records are transmitted separately so that title information can be acquired from the demand data stream rapidly, with description information following at a slower pace if necessary to maintain data flow within the constraints of the system bandwidth and decoder memory resources. The scheduling data can be transmitted in a preformatted manner, to reduce the amount of processing necessary at the decoder.

The transmitted scheduling data can be provided in a packetized transport stream in which different categories of data are carried in different packet streams, each packet stream having its own packet identifier (PID). Prompt acquisition and processing of the scheduling data at the decoder is facilitated by providing individual pages from the scheduling database, organized by time slot, in the transmitted data stream with each page (or group of pages) having its own PID. In this manner, when a user selects a time slot for which scheduling information is desired, the decoder identifies the corresponding page(s) and the PID(s) carrying the page(s). All of the necessary program guide information can then be acquired from the packets transmitted under the relevant PID(s). A separate packet stream is provided for foundation data, under a PID identifying the data as foundation data. Moreover, memory management at the decoder can allocate available memory resources to maintain substantially instantaneous access to current schedule information provided by the trickle data stream, while allocating memory to the demand data stream on an as needed basis.

Various display options for the guide will now be discussed. First, a viewer calls up the guide by pressing a remote control key, set-top box switch, or on-screen button. A "mini-guide" will appear on a portion of the video display (e.g., TV screen). The mini-guide will typically cover the bottom ¼–½ of the image area, but this is variable and will depend on the specific system design. The program information for the current channel being viewed is highlighted. When moving between the guide and other screens, the highlight will remain on the last channel highlighted. However, the display of the last channel viewed can be moved to the first row of the newly activated guide. In this manner, the user can easily move between the guide and a sequence of programming channels.

When a particular category or subcategory of programming is selected (e.g., sports), the video for the first channel that matches the desired category is displayed. The first channel is defined as the channel with the lowest numerical channel number. If the current channel already fits the desired category, there will be no channel switch.

Within the guide, it is possible to navigate between individual programs, channels, and time slots using, for example, a user interface device 46 (FIG. 2) such as a hand held infrared remote control. The guide may change its appearance as the user moves between the different fields. Moreover, the user can cause the guide display to scroll on the screen or page to a next page of the display.

Detailed information can be displayed (e.g., automatically or in response to the actuation of an "Info" button on a remote control as discussed below in connection with FIG. 11) for a specific program that is available currently or at a future date. Once a particular program is highlighted by the user through use of the remote control, switch on the set-top box, or on-screen button, the detailed information can be automatically displayed. This detailed information can include program title, channel number, channel name or call letters, featured actors and actresses, program description and other information such as year produced and whether the program is a rerun, start time, time left in program if currently running, icons (symbols or colors used to indicate program attributes such as closed captioning (CC), subtitles, colorization, black-and-white, stereo, surround sound, or Dolby® stereo, or to indicate whether the program is broadcast live, is one part of a multi-part series, contains dialogue (e.g., audio) in an alternate language, or offers interactive capabilities). Moreover, the mini-guide automatically handles time shifts to and from Daylight Savings Time and provides a help system to assist the user.

Furthermore, various aspects of the mini-guide are configurable to maximize flexibility and to anticipate future needs. For example, additional fonts can be provided, new icons can be downloaded for display, and various color schemes for background, foreground, text, and highlighting can be provided. Additionally, time and date formats, the number of columns and rows, the widths and heights of the columns, and the starting row and position of the mini-guide are all configurable. Finally, alternate language capabilities and alternate display fields are provided.

Figure 6:
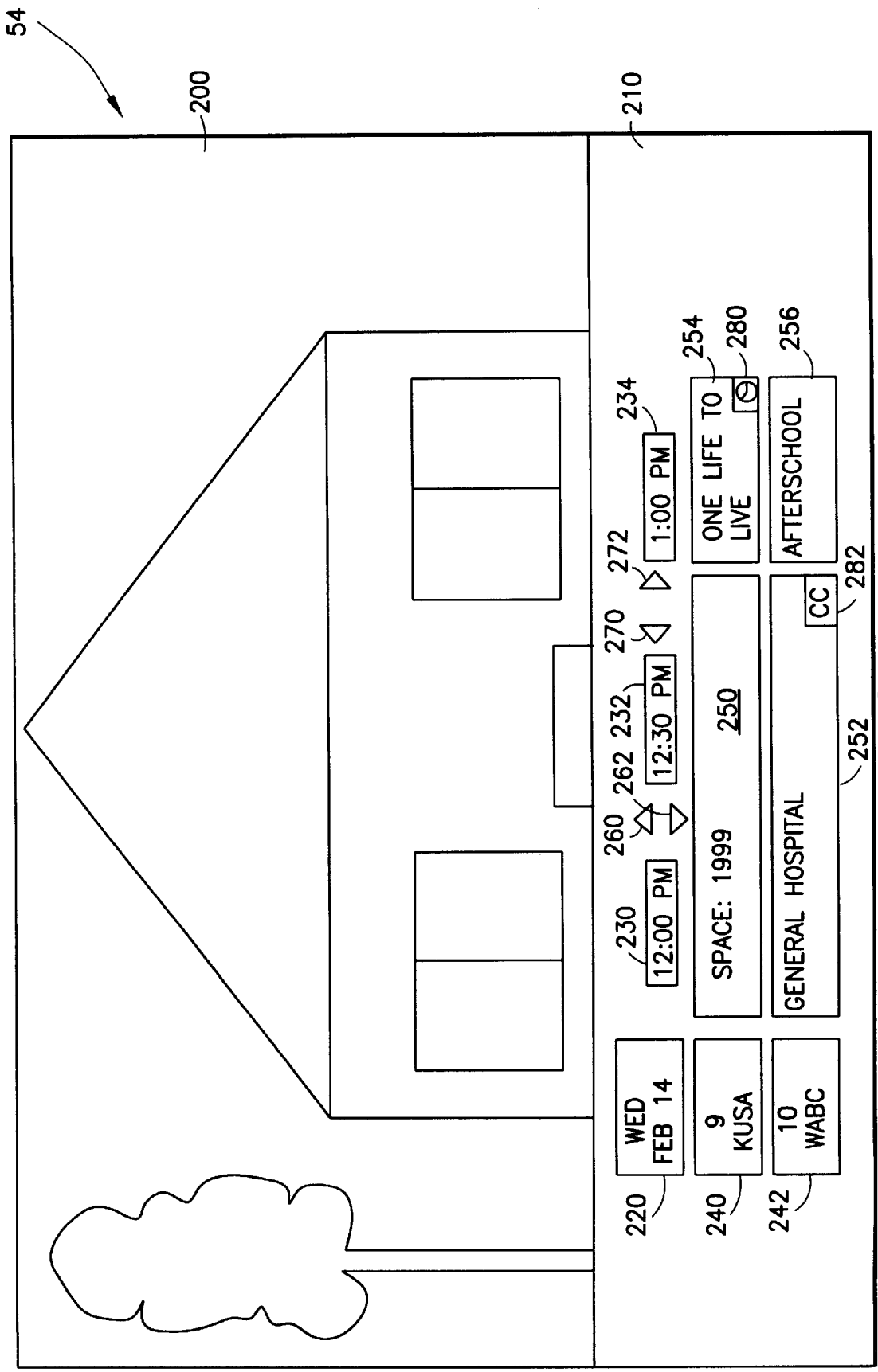
FIG. 6 is a diagrammatic illustration of a partial overlay display of the program guide.

Referring to FIG. 6, a diagrammatic illustration of a partial overlay display of the mini guide is disclosed. The display 54 includes a primary display area 200 which is shown partially obscured by the mini program guide display area 210. As shown, the program guide display area 210 appears at the bottom of the display 54, but could alternatively be placed at another location on the screen, such as at the top, in the middle, or as a vertical display on the left or right margin of the screen. The guide display area includes day and date field 220, time display fields 230, 232 and 234, programming service identifier fields 240 and 242, title fields 250, 252, 254 and 256, channel scrolling arrows 260 and 262, and time window scrolling arrows 270 and 272. Additionally, icons 280 (timer) and 282 (closed captioning) are shown. It will be appreciated that additional icons can also be provided, and that the program currently being viewed can be marked with an icon or other graphic indication, such as raised or sunken text or a special color.

Day and date field 220 indicates the date on which the programming displayed in the title fields 250, 252, 254, and 256 is available. When the guide is first displayed, the day and date field will default to the current day and date. The time display fields 230, 232 and 234 indicate the time of day in which the programming displayed in the title fields 250, 252, 254, and 256 is available. For example, time field 230 indicates the starting time of the programming described in title fields 250 and 252. Similarly, time field 234 indicates the approximate starting time of the programming described in title fields 254 and 256. Programming service identifier field 240 identifies the channel call letters corresponding to the title fields 250 and 254, while programming service identifier field 242 identifies the channel call letters corresponding to the title fields 252 and 256.

Channel scrolling arrows 260 and 262 inform the user that a corresponding button on the remote control (see FIG. 11 and discussion, below) will scroll the guide display either upwards or downwards to indicate the programming available on other channels at the times indicated in time fields 230, 232, 234. Time window scrolling arrows 270 and 272 inform the user that a corresponding button on the remote control will scroll the guide display to the left or right to allow the user to view programming available at different times and dates. For example, when the user first commands the guide to appear, programming for the current date and time of day will be displayed. In one embodiment, title fields corresponding to a time window of one and one-half hours will be displayed. Alternate embodiments can be provided in which the title fields correspond to other time periods. The user may view the programming available at a later time which is outside the current time window by pressing a right-arrow button on the remote control corresponding to arrow 272. The title field will scroll to the left in increments of, e.g., one-half hour, and time fields 230, 232, and 234 will change to indicate the new time window. If the user continues to scroll the title field to a time window that begins on a different date, the day and date field 220 will change accordingly.

In one embodiment, programming information of up to seven days is available for view. As discussed, scheduling information for, e.g., at least a current twenty-four hour period, and preferably a forty-eight hour period, may be provided from a trickle data stream, while scheduling information for a future period, e.g., one to seven days in the future, may be provided from a demand data stream. Thus, when a user requests to view programming services available in the current forty-eight hour period, trickle data stored in memory will be immediately accessed and used to produce the display. When the user requests to view programming services available after this forty-eight hour period, the demand data stream must be accessed.

For user convenience, the demand data stream must be rapidly acquired (preferably, within one to three seconds). As discussed previously, the necessary low acquisition time requires the delivery of IPG data not already stored in RAM at a high transmitted rate.

The titles fields 250, 252, 254 and 256 indicate the programming available from the corresponding service at the indicated time and date. Icon 280 in title field 254 is a clock. This indicates that the user has selected this program, as discussed below, to be displayed automatically at the appropriate starting time. Icon 282 in title field 252 is the designation "CC". This indicates that the program described in that title field includes a "closed captioning" signal. Other icons may be used as discussed previously.

Alternatively, the program guide display field 210 may appear at the top of the display 54, or may appear at both the top and bottom of the display 54 or at the sides thereof. Moreover, the size of the display can be preset or may be adjusted by the user. For example, as shown in FIG. 6, the guide provides information on two channels at a time. The user can adjust the number of channels displayed, thereby causing a commensurate change in the size of the mini guide display. In this way, the amount of overlay is adjusted as the user desires, and the user can access the guide while continually viewing a portion of the primary display, which is typically a television program, movie, or special event.

Figure 7:
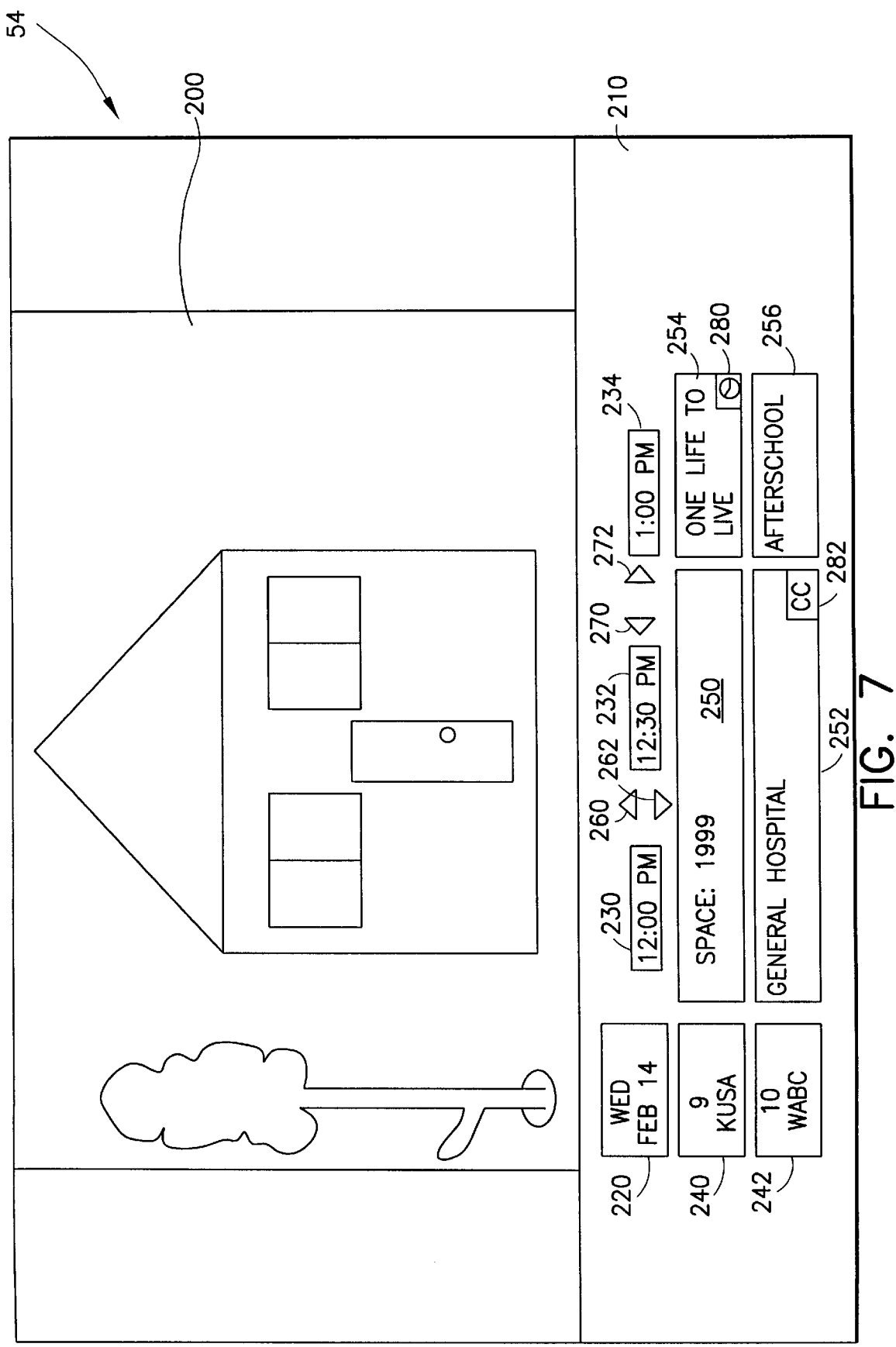
FIG. 7 is a diagrammatic illustration of a first embodiment of a partial overlay display of the program guide with reformatting of the primary display.

FIG. 7 shows a diagrammatic illustration of a first embodiment of a partial overlay display of the program guide 210 with reformatting (i.e., resizing of the video image) of the primary display area 200. In this embodiment of the present invention, the primary display area is reduced in size so that a full video image may be viewed concurrently with the guide without overlay. The guide display field 210 is displayed as described above, but the primary display field is reduced in both height and width and displayed, for example, above the guide field. This advantageously allows the user to view the primary field in whole while also accessing the interactive guide. Continuity of viewing of the primary programming is maintained while the attributes of programming on other channels is explored. Moreover, the reformatting may also adjust the aspect ratio of the primary display field to avoid or minimize any unused area of the display 54 which might otherwise appear blacked out.

Figure 8:
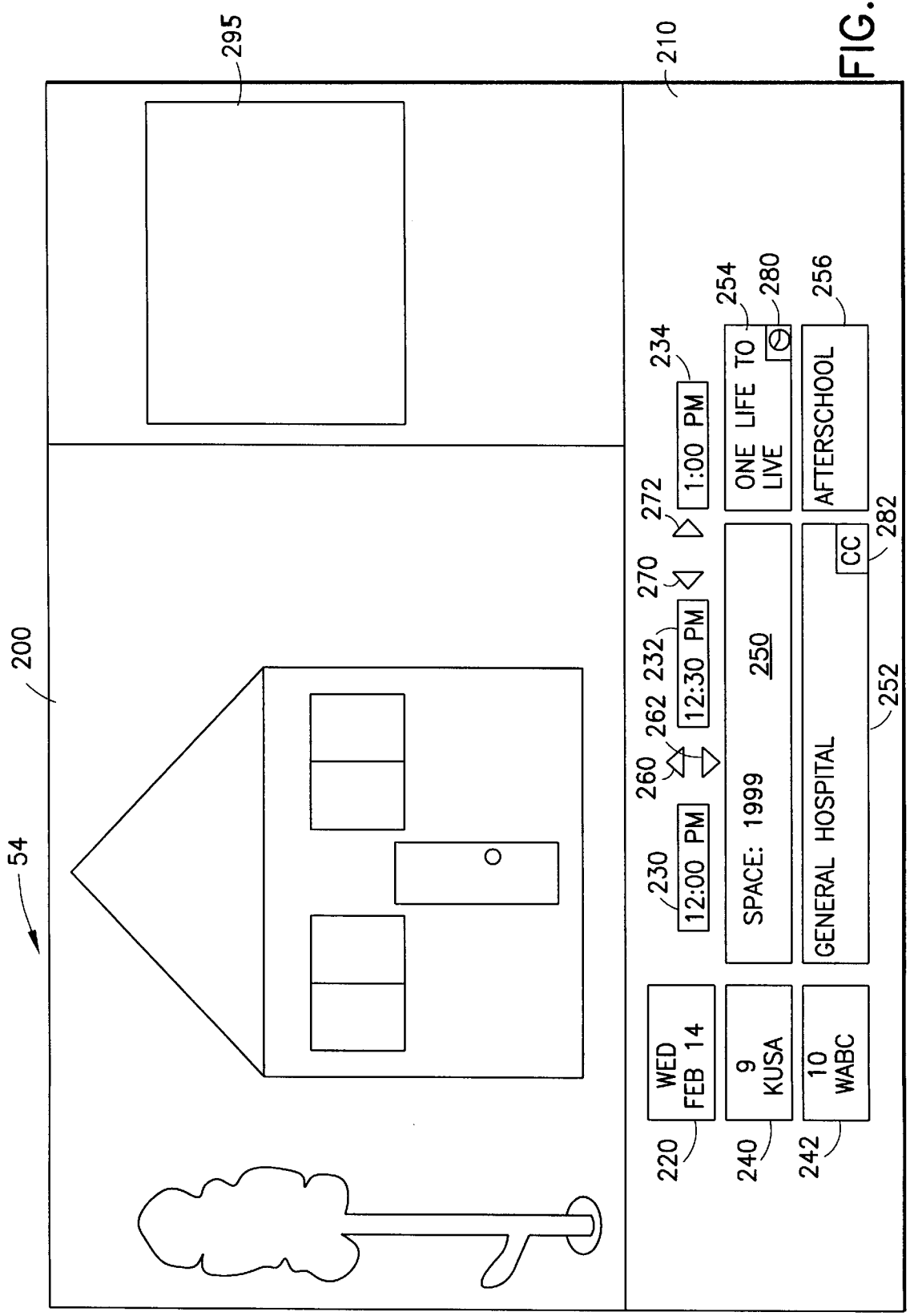
FIG. 8 is a diagrammatic illustration of a second embodiment of a partial overlay display of the program guide with reformatting of the primary display.

FIG. 8 is a diagrammatic illustration of a second embodiment of a partial overlay display of the program guide with reformatting of the primary display area. In response to a user command, the primary display area is reformatted such that an alternate display area 295 is created in which additional programming information is displayed. For example, the alternate display area may comprise a field which automatically displays detailed information on a program that is highlighted by the user on the guide using the remote control or other input device. In this manner, the user has access to detailed programming information while exploring the attributes of other channels and also maintaining continuity of viewing with the primary display field 200.

Figure 9:
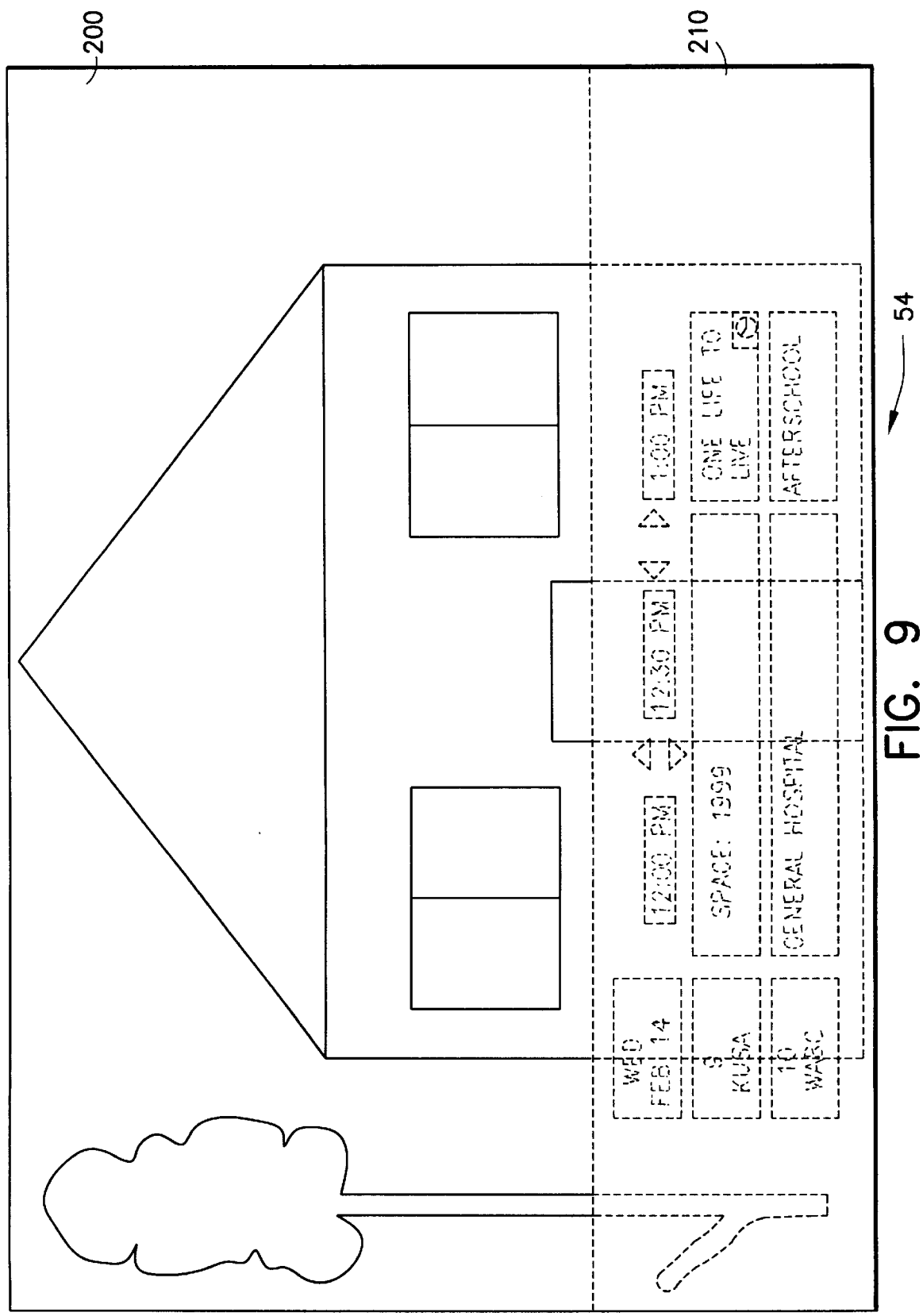
FIG. 9 is a diagrammatic illustration of a partial overlay display of the program guide with blending.

FIG. 9 is a diagrammatic illustration of a partial overlay display of the program guide with blending. A blended display (in which video and graphics are electronically mixed) allows the user to view the entire primary display area 200 and the guide display area 210 without reducing the size of the primary display area. The guide area is mixed with the corresponding portion of the primary field in a proportion, for example, of 50%. The guide display is thus rendered less obtrusive yet still visible and usable. Moreover, specific color options may be provided in the guide display field to ensure adequate visibility. The blending option is also available by user command.

Figure 10:
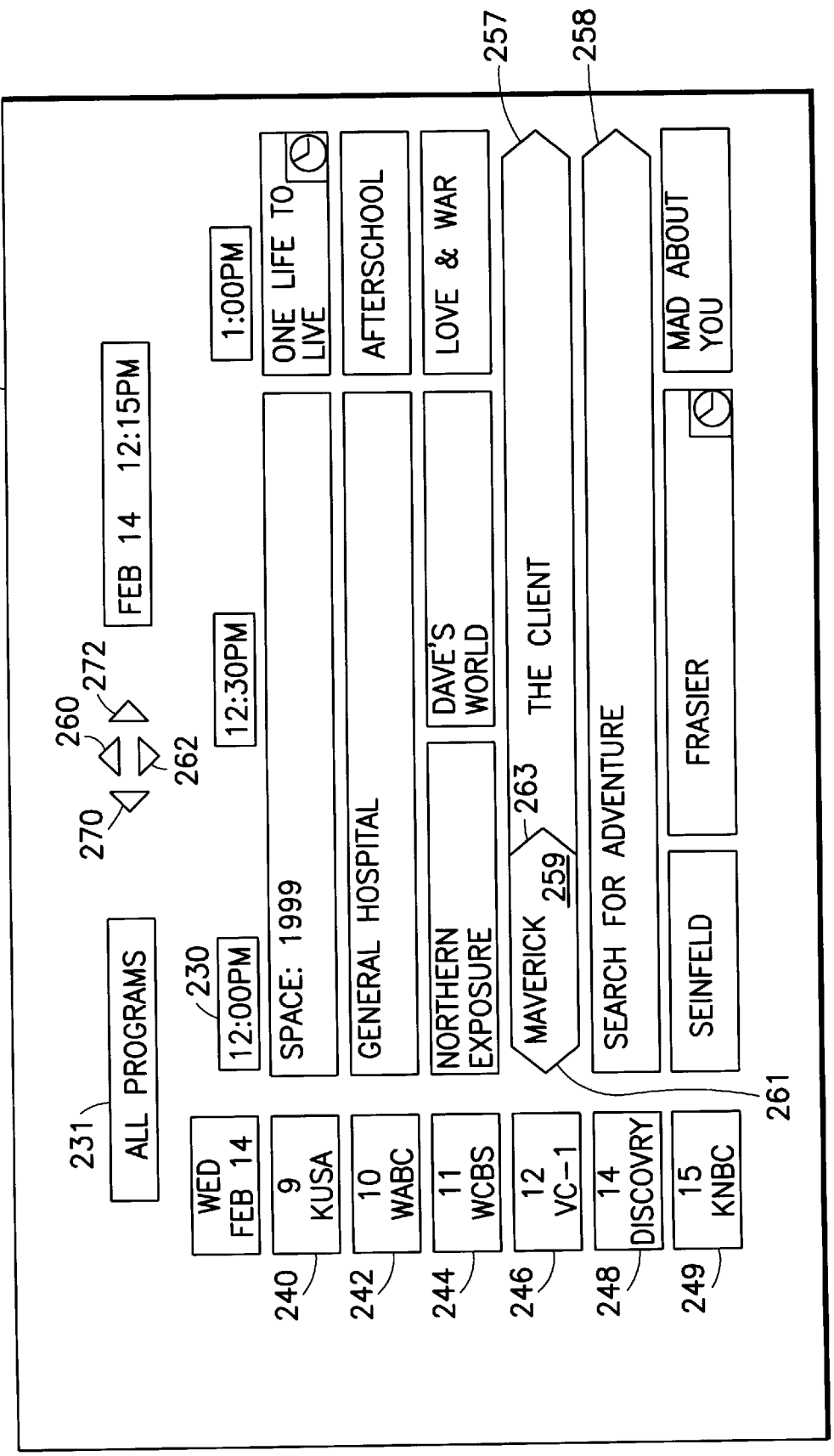
FIG. 10 is a diagrammatic illustration of a full screen display of the program guide.

FIG. 10 is a diagrammatic illustration of a full screen display of the program guide. Here, the user can view a larger amount of programming information with less required scrolling of the display. The user can thus find the desired programming information more quickly and conveniently when there is no requirement to maintain continuity of viewing with a primary channel. The various display configurations are switchable in response to a user command provided, for example, by a remote control.

In one embodiment, programming from six service providers is concurrently displayed over a one and one-half hour time window. When the user switches from the partial screen guide display (e.g., FIG. 6) to the full screen display, programming from the current service provider is displayed at the top of the guide while additional programming services are displayed below. For example, service provider fields 240 and 242 as shown at the top of the display indicate the same service providers as in FIG. 6 (e.g., channel 9—"KUSA", and channel 10 "WABC"). Additional programming service identifier fields 244, 246, 248 and 249 and corresponding title fields are also shown.

Title fields 257 and 258 have a distinctive appearance, such as a triangular shaped end, that indicates that the program extends beyond the current time window. Title field 259 also has a triangular shaped end 261 which indicates the program "Maverick" extends beyond the current time window. Specifically, the program started prior to 12:00 P.M., the time indicated in time field 230. Title field 259 also has a triangular shaped end 263 which indicates that the program "Maverick" overlaps with the program "The Client" of title field 257. This is possible since this programming service offers near video on demand programming. The guide thus informs the viewer that programming available for purchase may run concurrently. The title fields 257 and 259 may also be color-coded to otherwise indicate their special features.

Additionally, category field 231 indicates which category of programming services will be displayed. As shown, "All Programs" indicates that the guide display will include all available programming. Alternatively, the user may prefer that the guide display only programming services (channels) belonging to a specific class, such as movies, news, children's programming or comedy. Or, the user may request that the guide display only a preselected number of favorite channels.

Figure 11:
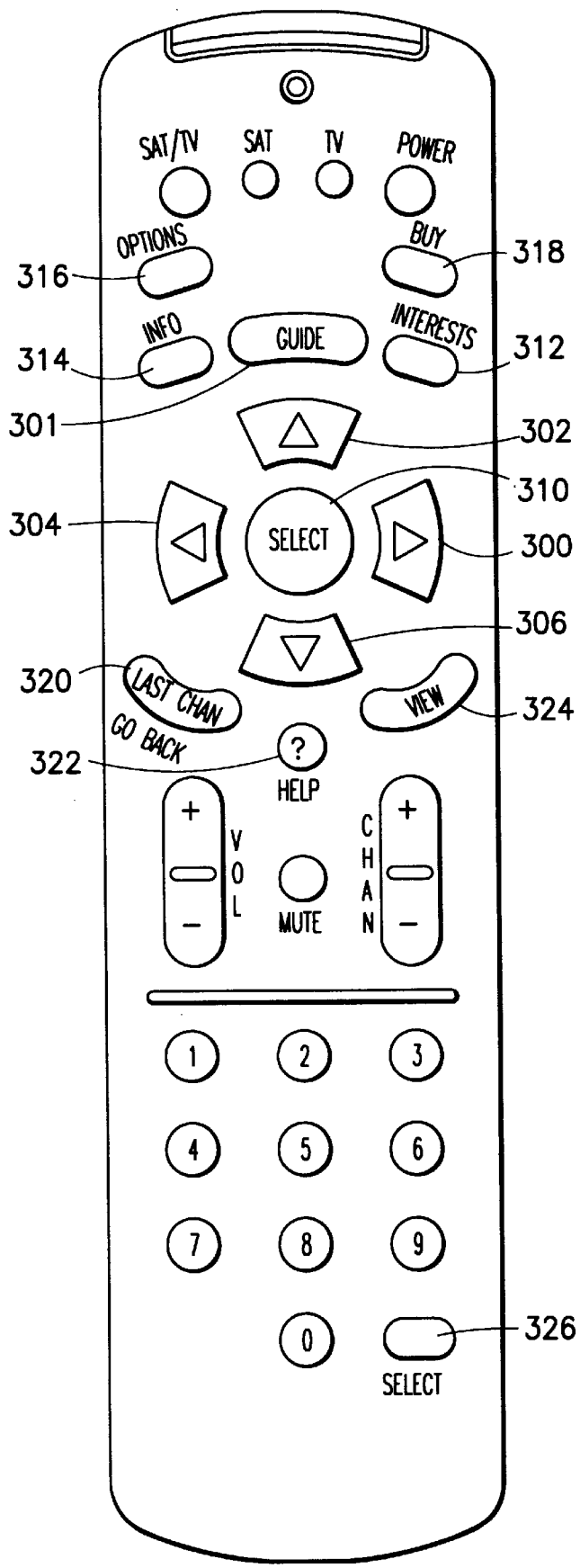
FIG. 11 is a diagrammatic illustration of a user-operated remote control interface device.

FIG. 11 is a diagrammatic illustration of a user-operated remote control interface device. "Guide" button 301 allows the user to switchably select between the mini-guide and the full screen guide. For example, pressing the "Guide" button 301 once will cause the mini-guide to appear on the screen, while pressing the "Guide" button 301 again will cause the full-screen guide to appear. Pressing the "Guide" button 301 yet again will cause the mini-guide to appear.

When the mini-guide or full-screen guide is displayed, the user uses arrow buttons 302 and 306 to highlight title fields and scroll the programming service display upwards or downwards, respectively, as indicated by channel scrolling arrows 260 and 262 in FIG. 10. Similarly, arrow buttons 300 and 304 are used to scroll the display to a time or date later or earlier than the time and date presently displayed. Note that there is usually no need to view any field corresponding to a program that has already concluded. The user can immediately view a program by using the arrow buttons to highlight a specific title field in the guide and pressing the "Select" button 310.

The "Interests" button 312 is used to change the Category field 231 (FIG. 10). Sequential operation of the "Interests" button 312 will cause the guide to display the various categories of programming available (e.g., movies, sports, comedy).

The "Info" button 314 produces a banner display which provides information on the programming service currently being viewed. This information can include the channel identifier, the title of the program, and the program run-time, as well as the other information mentioned hereinabove.

The "Options" button 316 allows the user to customize the guide, for example, by setting a favorite channel list or by setting parental control features for specific programming services. Other options, such as password control, timers, a message mailbox, access to purchase and account information, audio setup and installation options can also be provided.

Still referring to FIG. 11, the "Buy" button 318 allows the viewer to purchase pay-per-view programming including broadcast programming and near video on demand programming. The user highlights a desired program displayed in the guide and presses the "Buy" button 318. In one embodiment, viewer account status information is displayed and the viewer is asked to confirm the purchase. For example, a viewer's predetermined budget balance can be displayed or other pricing options relating to the programming may be displayed.

A "Last Channel" button 320 allows the user to redisplay the programming services viewed after sequential viewing a number of different services. For example, if a user sequentially views ten channels and desires to view those channels again in reverse order but does not recall the channel numbers, the user may simply repeatedly press the "Last Channel" 320 button to achieve this result.

A "Help" button 322 is context sensitive and displays information relating to the control buttons. For example, after pressing the "Buy" button 318, the user may desire additional detailed information related to buying a pay-per view programming event. This context-specific information can be viewed by pressing the "Help" button.

A "View" button 324 allows the user to immediately view a program which has been highlighted in the mini-guide or full-screen guide, or to go to the channel which has been keyed in using the numerical keypad buttons "0" through "9". A "Select" button 326 allows the user to view a specific channel which has been keyed in using the conventional numerical keypad shown.

The video processing required to superimpose the mini-guide on a primary image is well known in the art. For example, so-called picture-in-picture (PIP) and split-screen technology allow two separate programs to be viewed concurrently. The raster trace is modified to produce the two separate image fields. With a PIP display, the second program is embedded in the first program, whereas with a split-screen display, the two programs are typically viewed side by side on the left and right portions of the television screen. See, for example, commonly assigned U.S. Pat. No. 5,260,778 to M. Kaufmann et al. (Apparatus for Selective Distribution of Messages Over a Communications Network), issued Nov. 9, 1993.

It should now be appreciated that the present invention provides a method for displaying an interactive electronic program guide wherein a user may easily select a partial or full guide display, or return to a non-display status, for example, by pressing one button on a hand-held remote control. The invention allows the user to access the guide to obtain information on the attributes of the programming on the current or other channels while continuing to view the programming displayed on a primary channel.

Although the invention has been described in connection with various specific exemplary embodiments, it should be appreciated that numerous adaptations and modifications may be made thereto, without departing from the spirit and scope of the invention as set forth in the claims.

We claim:

1. A method for providing an interactive electronic program guide for a plurality of programming services available via an information network, comprising the steps of:

transmitting a trickle data stream at a first data rate with schedule data of at least one of said programming services for a current time period over said information network to a decoder;

providing a guide display area on a primary display area of a display device associated with said decoder which comprises a limited portion of said primary display area and provides information from said schedule data regarding the attributes of at least one of said programming services;

thereby allowing a user to access the guide while continuing to view the programming displayed on the primary display area;

storing said schedule data in a memory at the decoder;

providing said schedule data stored in said memory to said display device for use in said guide display area; and transmitting a demand data stream at a second data rate which is higher than said first data rate over said information network to the decoder;

wherein said demand data represents schedule data for a future time period which follows said current time period;

and a portion of said demand data stream which corresponds to a subset of said future time period is adapted to be selectively recovered from said transmitted demand data stream at said decoder according to a user command to view schedule data from said subset of said future time period.

2. The method of claim 1 wherein said current time period extends approximately from the current time to approximately twenty-four hours in the future.

3. The method of claim 2 wherein said demand data represents schedule data for a predetermined time period extending approximately from the twenty-four hours in the future to approximately seven days in the future.

4. The method of claim 1 wherein a user provided command switchably selects between said guide display area comprising said limited portion of said primary display area and a guide display area comprising substantially all of said primary display area.

5. The method of claim 1 wherein the program or service being displayed on the primary display area is resized to allow a user to view said program or service in a reduced size while also viewing said guide display area.

6. The method of claim 1, wherein:

said trickle data stream and said demand data stream are substantially continuously broadcast over said information network.

7. Decoder apparatus for providing an interactive electronic program guide on a video display in response to signals received from an information network, comprising:

means for recovering trickle data from said received signals at a first data rate, said trickle data comprising current schedule data for a current time period and being adapted for storage in a decoder memory and substantially instantaneous display at any time during a current time period;

means for selectively retrieving demand data from said received signals at a second data rate that is faster than said first data rate, said demand data being provided in pages and comprising future schedule data representing a future time period which follows said current time period, each of said pages containing demand data for different future time slots; and means for storing selectively retrieved pages of said demand data which corresponds to a subset of said future time period for display after the retrieval thereof from said information network;

said storing means being responsive to a user command to view schedule data corresponding to said subset of said future time period;

said video display comprising a primary display area and a guide display area, said guide display area comprising a limited portion of said primary display area;

wherein said guide display area provides information from at least one of said current and future schedule data;

thereby allowing a user to access the guide while continuing to view the programming displayed on the primary display area.

8. The decoder apparatus of claim 7 wherein the program or service being displayed on the primary display area is resizable to allow a user to concurrently view said program or service in a reduced size while also viewing said guide display area.

9. The decoder apparatus of claim 7 wherein a user provided command switchably selects between said guide display area comprising said limited portion of said primary display area and a guide display area comprising substantially all of said primary display area.

10. The decoder apparatus of claim 7 wherein said guide display area is blended with the portion of said primary display area collocated with said guide display area to allow a user to concurrently view both of said guide display area and said primary display area.

11. The decoder apparatus of claim 7, wherein:
   a plurality of programming services are available from said information network; and
   said guide display area provides information on the attributes of at least one of the programming services, including a first program which is available during a first time slot, and a second program which is available in a second time slot which is adjacent to said first time slot.

12. The decoder apparatus of claim 11, wherein:
   said first and second time slots are both part of said current schedule data.

13. The decoder apparatus of claim 11, wherein:
   said guide display area is controllable in response to a user command to provide information on the attributes of at least one other of said programming services.

14. The decoder apparatus of claim 7, wherein:
   said limited portion is between approximately one-fourth and approximately one-half of the primary display area.

15. The decoder apparatus of claim 7, wherein:
   said information network is one of a cable television network and satellite television network.

16. The decoder apparatus of claim 7, wherein:
   said current time period extends approximately from the present time to approximately twenty-four hours in the future.

17. The decoder apparatus of claim 7, wherein:
   said future time slots extend approximately from twenty-four hours in the future to approximately seven days in the future.

18. The decoder apparatus of claim 7, wherein:
   a user provided command switchably selects between said guide display area comprising said limited portion of said primary display area and a guide display area comprising substantially all of said primary display area.

19. The decoder apparatus of claim 7, wherein:
   said guide display area is blended with a portion of said primary display area collocated with said guide display area to allow a user to concurrently view both of said guide display area and said primary display area.

20. The decoder apparatus of claim 19, wherein:
   the blending between said guide display area and said collocated portion of said primary display area is in a proportion of approximately 50%.

21. The decoder apparatus of claim 7, wherein:
   said means for selectively acquiring demand data is responsive to a user command to display schedule data of said future time slots.

22. The decoder apparatus of claim 7, wherein:
   said trickle data and said demand data are substantially continuously broadcast over said information network.

\* \* \* \* \*